(12) United States Patent
van de Velde Keyser et al.

(10) Patent No.: US 6,432,338 B1
(45) Date of Patent: Aug. 13, 2002

(54) PROPULSION SYSTEM FOR CONTOURED FILM AND METHOD OF USE

(75) Inventors: Herbert Sybrant van de Velde Keyser, Lochristi; Dirk Gustaaf Remi Vanden Broecke, Sint-Martens-Latem, both of (BE)

(73) Assignee: Solutia Europe S.A./N.V., Brussels (BE)

(*) Notice: Subject to any disclaimer, the term of this patent is extended or adjusted under 35 U.S.C. 154(b) by 0 days.

(21) Appl. No.: 09/486,713
(22) PCT Filed: Sep. 8, 1998
(86) PCT No.: PCT/EP98/05679
§ 371 (c)(1),
(2), (4) Date: May 30, 2000
(87) PCT Pub. No.: WO99/14145
PCT Pub. Date: Mar. 25, 1999

(30) Foreign Application Priority Data

Sep. 12, 1997 (EP) .............................. 97870135

(51) Int. Cl.⁷ ..................... B29C 69/00; B65G 15/02; B65H 23/02
(52) U.S. Cl. ................. 264/160; 198/617; 198/782; 198/793; 264/238; 264/340
(58) Field of Search .................. 264/160, 238, 264/340; 198/617, 782, 793

(56) References Cited

U.S. PATENT DOCUMENTS

| | | |
|---|---|---|
| 4,234,567 A | 11/1980 | Flanner |
| 4,372,435 A | 2/1983 | Bradbury |
| 5,071,601 A | 12/1991 | Matsuda |
| 5,087,502 A | 2/1992 | Esposito et al. |
| 5,137,673 A | 8/1992 | Bourcier et al. |

FOREIGN PATENT DOCUMENTS

| | | |
|---|---|---|
| DE | 19500505 | 7/1996 |
| EP | 0051039 | 5/1982 |
| FR | 2058837 | 5/1971 |
| GB | 2233597 | 1/1991 |
| JP | 4292937 | 10/1992 |
| JP | 5329882 | 12/1993 |

OTHER PUBLICATIONS

Abstract for DE 19500505 (Jul. 11, 1996).
Patent Abstracts of Japan, for JP 5–329882 (Dec. 14, 1993).
Esp@Cenet of Japan, for JP 5–329882 (Dec. 14, 1993).
Patent Abstract of Abstract for JP 4–292937 (Oct. 16, 1992).
Esp@Cenet of Japan, for JP 4–292937 (Oct. 16, 1992).

*Primary Examiner*—Leo B. Tentoni
(74) *Attorney, Agent, or Firm*—Lathrop & Gage L.C.

(57) ABSTRACT

Film treatment surface provided with a propulsion system for circularly contoured film (5) along a circular path are disclosed. The essential propulsion and steering system is represented by two adjustable disks (2, 3), one being equipped with a propulsion wheel and a steering mechanism whereas the second disk embodies an idler wheel and a steering mechanism. The treatment surface was found to be beneficially suitable for the manufacture of cut shaped blanks made from shaped films of plasticized polyvinyl butyral. The blanks can be used in automobile windshields.

10 Claims, 2 Drawing Sheets

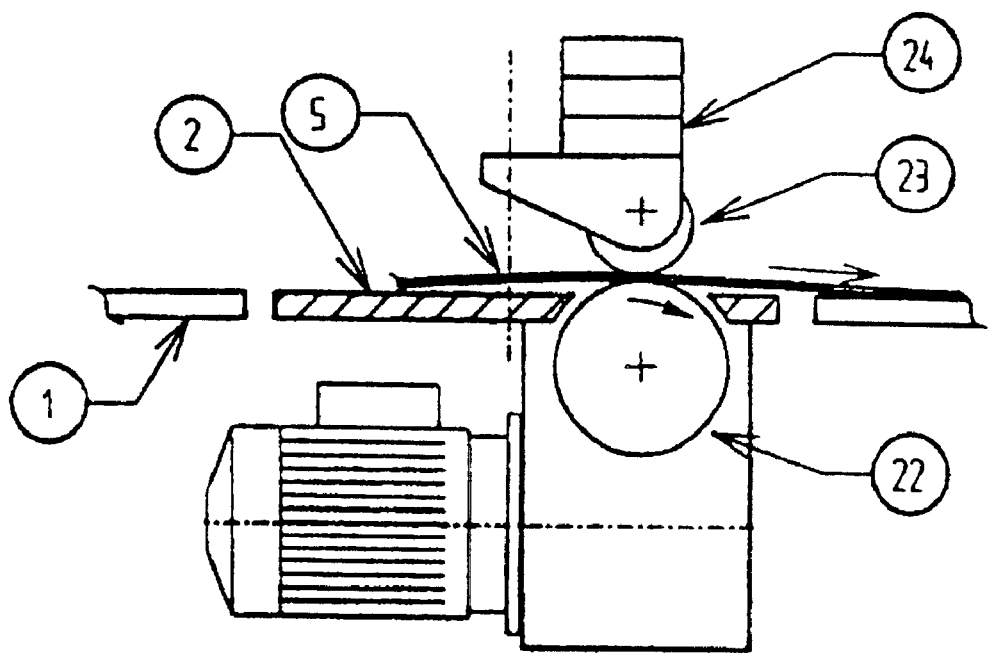
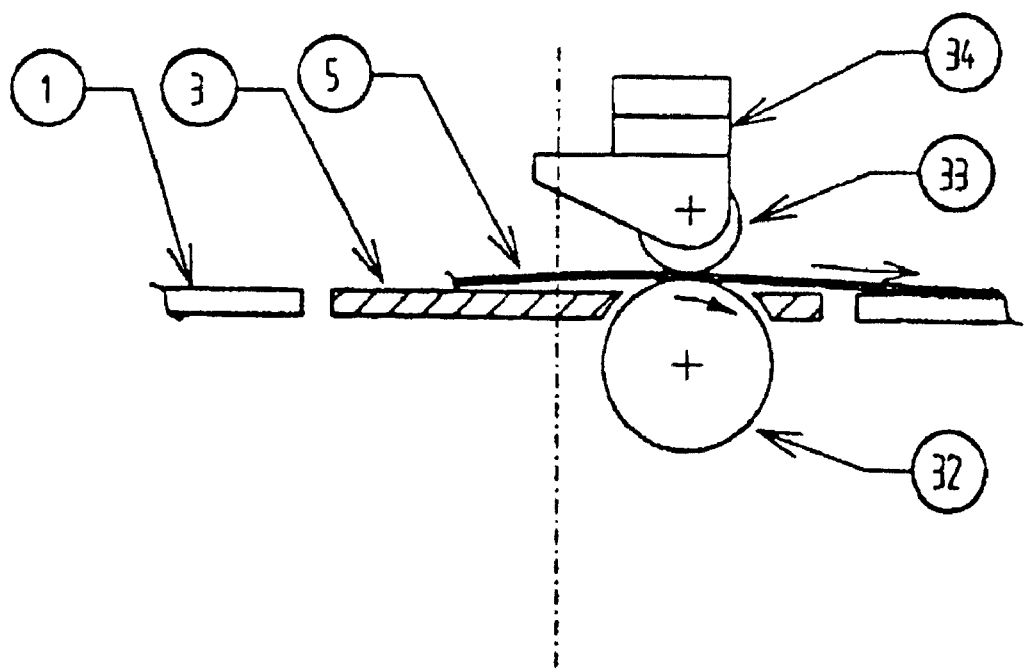

PROPULSION SYSTEM FOR CONTOURED FILM AND METHOD OF USE

BACKGROUND OF THE INVENTION

This invention relates to a propulsion system for contoured film embodied in a treatment surface for contoured films, said surface being provided with the propulsion system comprising one adjustable disk with a propulsion wheel and a second adjustable disk with an idler wheel. Each of the adjustable disks is provided with a steering mechanism. The films are most preferably represented by circularly contoured films. The invention also relates to a method for the propulsion and/or handling of any contoured film on a treatment surface comprising two adjustable disks, one disk being equipped with a propulsion wheel and the second disk with an idler wheel, whereby both disks provide a steering functionality in connection with the propulsion.

The state-of-the-art relating to film propulsion equipment is crowded and diverse. The art relating to the propulsion of contoured film is very limited in part due to the unusual problems to be resolved. Arcuately formed web of plastic film is used for the production of automobile windshields, having in particular a tinted band along the upper side. It is currently desirable to stretch the originally straight web, of for example polyvinyl butyral interlayer, into a curved web that fits along the upper side of the windshield. The so curved web is subsequently cut to produce the appropriate cut shaped blanks that will be used as interlayer between two sheets of glass for the manufacture of laminated windshields. After the stretching operation, the shaped web is normally manually moved over one or more cooling tables and is subsequently, also manually, cut to size. The propulsion of linear films on treatment surfaces by means of mechanical propulsion is well known and has been used for a long time. Non-linear films were, chiefly due to difficulties attached to controllable mechanical propulsion, mainly moved maually. Existing systems were notoriously deficient for moving, in a controlled manner, contoured films, particularly circularly shaped films.

U.S. Pat. No. 5,137,673 describes a process for forming cut shaped blanks of plasticized polyvinyl butyral of curved configuration matching the contour of the windshield of which the blank will be a component The film curvature is obtained by passing the film over frusto-conical rolls whereas one or more conical rolls will support the curved film along a forwardly curved arcuate path leading to the cutting station. U.S. Pat. No. 4,234,567 describes a set of conical pull rolls for moving circularly contoured film over a treatment surface. The apex of the conical rolls should coincide with the center of the film radius. It is also known that multiple driven wheels equally spaced across the width of the arcuately formed web can be used. The speed variations among the rolls then determine the radius of the path. JP-A-05329882 discloses the moving of film having a curved contour by using a movable die with curved wall into which the film is clamped JP-A-04292937 describes the moving of biaxially oriented film by means of a steam floating process. The prior art is not possessed of economically viable means for moving circularly contoured film along a circular path to thus secure, for treatment and/or handling purposes, a continously stable position in relation to selected reference points. Consequently, the like circularly curved films cannot be processed filly automatically but rather require, economically marginal, manual adjustments.

SUMMARY OF THE INVENTION

It is, therefore, a first object of the invention to generate a treatment surface which can be utilized beneficially for the propulsion and/or handling of contoured (non-linear/non-rectangular) films. Another object of the invention aims at providing a film treatment table which can serve for progressing/processing circularly contoured films in accordance with a selected pattern. Still another object of the invention relates at generating a film treatment surface equipped with a combined moving and steering mecanism. Yet another object of the invention aims at making available a method for continously propelling and/or handling a circularly contoured film along a circular path. The above and other objects of the invention can now be met with the aid of a treatment surface comprising, at least, two adjustable disks one of which is provided with steering and propulsion mechanisms whereas the second adjustable disk comprises a steering mechanism and an idler wheel. Further details of the inventive technology herein are described below.

The above and other objects are now accomplished by a treatment surface provided with a propulsion system for circularly contoured film along a circular path to thus secure, for treatment and/or handling purposes, a stable position of the film in relation to selected reference points comprising a handling surface having a first adjustable disk provided with a propulsion wheel and a steering mechanism and a second adjustable disk provided with an idler wheel and a steering mechanism

BRIEF DESCRIPTION OF THE DRAWINGS

The invention also relates to a preferably continuous process for the manufacture of cut shaped blanks whereby a circularly contoured film is moved over a treatment surface in accordance with the invention herein to a cutting station. The invention also contemplates the use of the treatment surface in accordance with the claims for the manufacture of cut shaped blanks from a shaped polyvinyl butyral film.

In describing the invention, reference will be made to the accompanying drawings wherein:

FIGS. 2 and 3 represent cross-sectional views through adjustable disks 2 and 3 along lines 6—6 and 7—7 respectively.

DETAILED DESCRIPTION OF THE INVENTION

Figure 1:
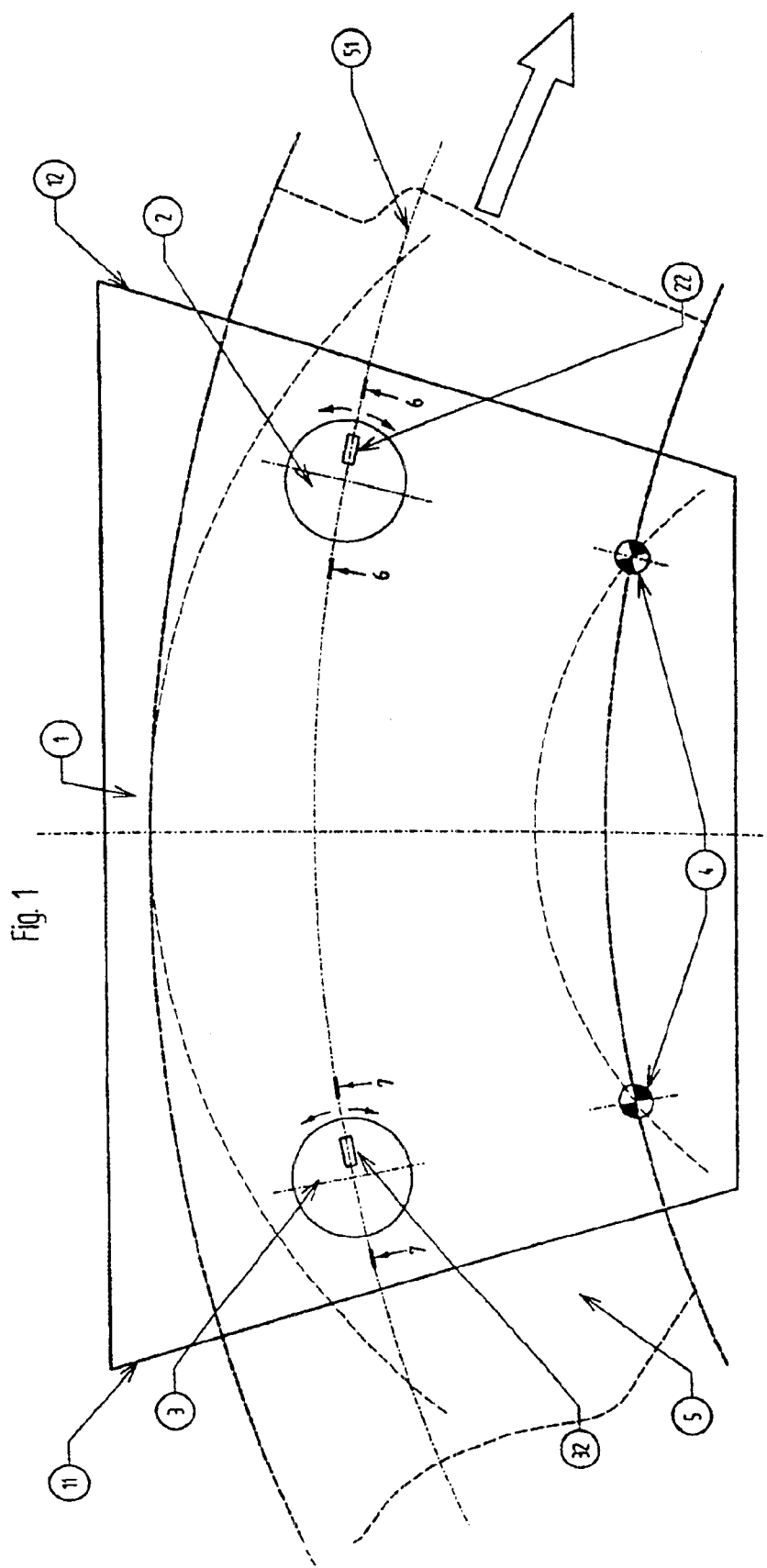
FIG. 1 is a plan view of a treatment surface embodying the claimed invention.

The invention is described and explained under particular reference to the drawings. The treatment surface 1 can be used for treating and handling shaped interterlayer blanks. It is usually a flat surface into which two adjustable disks 2,3 are embedded. The entry border and the exit border of the treatment surface should preferably be substantially perpendicular to the film path, hence the treatment surface can have the shape of a trapezium. The circular path generally, 51 specifically, is a center line going through the centers of both adjustable disks, whereby the center of the circular line coincides with the center of the outer and inner borders of the contoured web. The preferred length of circular path 51 on the treatment surface should not be more than 5 meters to avoid film wrinkling in the tensioned section of the sheet and to avoid film buckling in the pressure section of the sheet. The tension section of the web is the part of the web preceding (in the direction of the movement) the propulsion wheel whereas the pressure section of the web is the part past the propulsion wheel. The preferred circular path length is generally in the range of from 1.5 to 5 meters. With respect to plasticized polyvinyl butyral film, the length of the path length shall preferably be in the range of from 2to 4.5 meters, more preferably from 2.5 to 4 meters. Disk 2, positioned near to the exit point of the curved web from the table, comprises a propulsion wheel 22 protruding a few millimeters, generally within the range of from 0.2 to 5 millimeters, above the surface. The final selection of the protruding distance of the propulsion wheel can slightly vary depending upon the physical and/or chemical parameters of the web and is such that the wheel provides effective propulsion without causing physical damage to the web. The adjustable disk 2 with the propulsion wheel is located near the exit point of the treatment surface, preferably not more than 50%, based on the length of the circular path 51 (100%), from the exit border. The second adjustable disk 3 is positioned near the entry border of the treatment surface, not more than 20%, based on the length of said path 51 on the treatment surface (100%), from the entry border. Preferably, particularly in relation to plasticized polyvinyl butyral film, adjustable disk 2 is located at a position from 30% to 45%, based on the length of the path 51 on the treatment surface (100%), from the exit border 12. Concurrently, adjustable disk 3 is located at a position from 0% to 20%, based on the length of the path 51 on the treatment surface, from the entry border 11. The adjustable disks 2,3 are located in the middle section of the web 5, preferably the region extending from 25% to 75% of the width of the web.

Reference points 4 can be selected on virtually any location in relation to the film. The preferred position is either on the inner or on the outer side of the web. This allows the utilisation of suitable detection systems on both reference points to thus provide direct steering input for both adjustable disks. A preferred detection system is based on the use of photocells. The signals from the photocells steer the respective servomotors connected to the adjustable disks. The so induced rotation of a disk brings back the film on its original trajectory at the circular path.

FIG. 2 represents a cross-sectional view along line 6—6 of FIG. 1. It shows adjustable disk 2, embedded into the treatment surface 1, and the propulsion (driven) wheel 22. The contoured film 5 is pressed against propulsion wheel 22 by a swivel roller 23. The pressure is achieved by putting weights onto roller 23. The weights can be determined routinely thereby taking into consideration obvious composite properties. The pressure control onto roller 23 can also be achieved by functionally comparable means such as pneumatic means, springs, etc.

FIG. 3 represents a cross-sectional view along line 7—7 of FIG. 1. It shows adjustable disk 3, embedded into the treatment surface 1, and idler wheel 32. The function and operation of swivel roller 33 is as described for swivel roller 23. The optional pressure control for roller 33 is also as for roller 23 above.

The plastic, preferably plasticized polyvinyl butyral, film can be shaped, for use in connection with the claimed invention, by known manufacturing technics and shall, for obvious reasons be cut without intermediate storage. A well-known process for producing suitably shaped films is described in EP-A-0,685,316.

What is claimed is:

1. Treatment surface (1) provided with a propulsion system for a web (5) of circularly contoured film along a circular path (51) to secure, for treatment and/or handling purposes, a stable position in relation to selected reference points, comprising a treatment surface (1) having a first adjustable disk (2) provided with a propulsion wheel (22) and a steering mechanism and a second adjustable disk (3) provided with an idler wheel (32) and a steering mechanism.

2. Treatment surface in accordance with claim 1 wherein the adjustable disk (2), embedded into the flat treatment surface (1), provided with a propulsion wheel is located at a distance of not more than 50% of the total length of the circular path (51) on the treatment surface, from the exit border (12).

3. Treatment surface according to claim 1 wherein the adjustable disk (3), embedded into the flat treatment surface (1), provided with an idler wheel is located at a distance of not more than 20% of the total length of the circular path (51) on the treatment surface, from the entry border (11).

4. Treatment surface according to claim 3 wherein the adjustable disk (2), embedded into the flat treatment surface (1), provided with a propulsion wheel is located at a position of from 30% to 45%, based on the length of the circular path (51), from the exit border (12).

5. Treatment surface according to claim 1 wherein the surface has oblique entry (11) and exit (12) borders perpendicular to the circular path (51).

6. Treatment surface in accordance with claim 5 wherein the path length (51) is from 1.5 to 5 meters.

7. Treatment surface (1) provided with a propulsion system for a web (5) of circularly contoured plasticized polyvinyl butyral film along a circular path (51) to secure, for treatment purposes, a stable position in relation to selected reference points, comprising a treatment surface (1) having a first adjustable disk (2) provided with a propulsion wheel (22) and a steering mechanism and a second adjustable disk (3) provided with an idler wheel (32) and a steering mechanism, said first adjustable disk being located at a position of from 30% to 45% of the total length of the circular path (51) on the treatment surface, from the exit border (12), said second adjustable disk being located at a position from 10% to 20% of the total length of the circular path (51) on the treatment surface, from the entry border (11), and both adjustable disks being located in the web (5) region extending from 25% to 75% of the total width of the web.

8. A method for the manufacture of cut shaped blanks from a shaped plasticized polyvinyl butyral film comprising moving a circularly contoured film over a treatment surface of claim 1 to a cutting station and cutting said circularly contoured film.

9. Method for the propulsion and/or handling of a web (5) of circularly contoured film comprising moving said web, in a stable position in relation to selected reference points, over a treatment surface (1) having a first adjustable disk (2) provided with a propulsion wheel (22) and a steering mechanism and a second adjustable disk (3) provided with an idler wheel (32) and a steering mechanism.

10. Treatment surface in accordance with claim 5 wherein the path length (51) is from 2.5 to 4 meters.

* * * * *